Patented Nov. 2, 1937

2,098,114

UNITED STATES PATENT OFFICE 2,098,114

PROCESS FOR SULPHONATING ALCOHOLS

Chester Merle Suter, Evanston, Ill., assignor of twenty-five per cent to The Procter & Gamble Company, Cincinnati, Ohio, a corporation of Ohio No Drawing. Application October 17, 1935, Serial No. 45,505

7 Claims. (Cl. 260—99.12)

This invention relates to a new process of forming sulphuric reaction products by treatment of aliphatic alcohols, with a new sulphonating reagent, namely, the addition product of sulphur trioxide with dioxane. The term sulphuric reaction products as used herein includes sulphuric esters and sulphonic acids.

It is an object of my invention to develop an improved process of making the sulphuric esters of higher alcohols.

Another object is to produce these compounds in a purer condition than has hitherto been practicable.

It is already known that 1,4-dioxane reacts with ordinary concentrated sulphuric acid to form an oxonium salt with the composition $$O(CH_2CH_2)_2O \cdot H_2SO_4$$

I have now found that sulphur trioxide reacts with 1,4-dioxane to form a coordination compound which is not an oxonium salt but the anhydride of same. Furthermore, 1,4-dioxane can add two molecules of the sulphur trioxide but only one molecule of sulphuric acid. The reaction between sulphur trioxide and 1,4-dioxane occurs in two stages which are represented by the following equations:

$$O(CH_2CH_2)_2O + SO_3 \rightarrow O(CH_2CH_2)_2OSO_3$$

$$O(CH_2CH_2)_2OSO_3 + SO_3 \rightarrow O_3SO(CH_2CH_2)_2OSO_3$$

The amount of sulphur trioxide present in the two products above, or a mixture of same, will vary between about 47 and 65 per cent. These products are characterized by decomposition with water to form sulphuric acid and 1,4-dioxane, and by lack of stability toward heat; they decompose without melting when kept at a temperature of about 60 to 70° C. These compounds with sulphur trioxide have not previously been known as far as I am aware. I have, furthermore, found that either of these sulphur trioxide compounds, or a mixture of the two in any proportions, is useful as a sulphating and sulphonating agent, which discovery is also new as far as I am aware, and offers many advantages as hereinafter set forth.

In the prior art, sulphuric esters of higher alcohols have most commonly been formed by treating the alcohol with strong sulphuric acid, fuming sulphuric acid, sulphur trioxide, or with chlorsulphonic acid. Likewise, unsaturated compounds having an olefin linkage have been converted to sulphonic acids by treating same with sulphuric acid, or chlorsulphonic acid, or indirectly by the well known Strecker reaction. Such reagents as sulphuric acid, chlorsulphonic acid, etc., are commonly referred to as "sulphonating agents", regardless of whether they are used to form true sulphonic acids or to form sulphuric esters, and I have employed this term with the same breadth of meaning in this specification. These procedures, however, especially in the case of the acid treatment of unsaturated compounds, frequently involve the production of certain by-products due to polymerization, charring, etc., and can only be accomplished satisfactorily by using an excess of the sulphonating agent. When these products are then neutralized, the excess sulphonating agent is also neutralized with the formation of considerable sodium sulphate, and/or sodium chloride, etc., which remains in the product as a diluent unless previously separated by an additional treatment. My process of sulphating or sulphonating is substantially free from these objections.

I first prepare the sulphur trioxide addition product in the following manner, for example; to a solution of 5.4 parts of 1,4-dioxane in 75 parts of a suitable solvent such as carbon tetrachloride is added 7.5 parts of sulphur trioxide. The sulphur trioxide may be added in any convenient manner, either as a solid, liquid or vapor. A white sludge of the insoluble addition product appears in the reaction mixture. This mixture is employed without further treatment either as a sulphating agent or as a true sulphonating reagent. Filtration of the mixture through a sintered glass filter gives a white solid product which on analysis is found to contain about 55 per cent sulphur trioxide. In commercial work it is more economical to add more sulphur trioxide so that the amount of this in the addition product will approximate 65 per cent.

Besides sulphur trioxide itself, I find that certain other products may be used which contain sulphur trioxide in a loosely bound form from which it is readily liberated when treated with dioxane. Fuming sulphuric acid ("oleum", 60–80%) and chlorsulphonic acid, for example, are products of this class which form compounds with dioxane similar to that formed by sulphur trioxide but differing from that formed by ordinary sulphuric acid, and which act like the sulphur-trioxide-dioxane product in sulphation and sulphonation reactions. For this purpose the compounds containing sulphur trioxide in loosely bound form may be considered as equivalents for sulphur trioxide, and the several products although perhaps differing in some respects may be termed, together with the addition product of sulphur trioxide alone, as the addition product of sulphur trioxide with dioxane.

Various inert solvents for the sulphur-trioxide-dioxane addition product may be used, such as carbon tetrachloride, carbon bisulphide, sym-tetrachloroethane, and ethylene dichloride.

The terms "suitable solvent" and "inert solvent" are used herein to denote solvents that dissolve both dioxane and the substance to be sulphonated or sulphated, and that do not react with the sulphonating reagent with sufficient rapidity to interfere with its use.

Sulphation or the production of sulphuric esters of aliphatic alcohols may then be carried out in the following manner.

*Example 1.*—To a portion of the reagent prepared as indicated above containing 7.0 parts of sulphur trioxide is added 10.0 parts of lauryl alcohol at room temperature. After the reaction is complete as shown by disappearance of the addition product, the mixture is then neutralized with an alkali such as aqueous potassium carbonate solution, and the carbon tetrachloride layer separated. On standing over night the aqueous solution deposits white crystals of potassium lauryl sulphate.

My sulphur trioxide addition product of dioxane is found to react readily at room temperature in this way with alcohols in general, including low molecular alcohols such as for example normal butyl alcohol, or the alcohols present in commercial lorol which consists mainly of lauryl alcohol, or other higher alcohols such as cetyl, oleyl and stearyl for example, to give directly the sulphuric ester of the alcohol or, in other words, alkyl hydrogen sulphate. For lauryl alcohol the reaction may be written as follows:

The reaction is practically complete and gives a product practically free from sulphuric acid besides avoiding the charring action characteristic of stronger sulphonating agents. The dioxane which is set free in the reaction may be recovered by distillation or otherwise in form for re-use.

The sulphated product can be neutralized with the hydroxide or carbonate of sodium, potassium, or other bases. The soluble salts thus formed, especially those of the alkali metals, with the sulphated higher aliphatic alcohols, containing from about ten to about twenty-two carbon atoms in the molecule, have excellent wetting, sudsing and detergent properties.

This sulphur trioxide addition product is also useful in converting substances containing one or more olefin bonds into water-soluble sulphonic acids. Thus, reaction occurs readily with as diverse materials as amylene, indene and olive oil. This reaction likewise occurs readily at room temperature, or preferably lower, without the undesirable side reactions such as polymerization and charring accompanying the use of other sulphonating agents. My reagent reacts with molecules which contain both hydroxy and olefine groups to produce compounds having both the sulphate ester and the sulphonic acid groups. In this case enough of the reagent should be used to react with both groups. This reaction occurs, for example, with ricinoleic acid or castor oil.

Sulphonation of unsaturated aliphatic compounds having olefine linkages may be carried out in accordance with the two following examples.

*Example 2. Sulphonation of 2-pentene.*—To an ice cold mixture of 8 g. of sulphur trioxide and 4.4 g. of dioxane in 50 cc. of carbon tetrachloride was added slowly with stirring 6 cc. of 2-pentene dissolved in 25 cc. of the same solvent. Reaction was instantaneous. After filtering from a slight flocculent precipitate, the clear filtrate was treated with water whereupon a separation into two layers occurred with an evolution of heat. The acid layer was separated and neutralized with sodium hydroxide and evaporated to dryness. The resulting product was a mixture of a water-soluble sodium salt of the sulphonic acid and sodium sulphate from which the former was separated by means of its solubility in alcohol.

*Example 3. Sulphonation of olive oil.*—To a solution of 10 cc. of dioxane in 40 cc. of ethylene dichloride kept in ice was added with stirring 13.3 g. of 60% oleum. The mixed addition products of dioxane-sulphur trioxide and dioxane sulphate separated out gradually, chiefly upon the walls of the reaction flask. To this mixture kept at about 10° C. was added with shaking a solution of 15 g. of olive oil in 25 cc. of carbon tetrachloride. The reaction mixture became somewhat green in appearance. After standing for 15 minutes the unchanged dioxane sulphate (only the sulphur trioxide reacts appreciably under these conditions) was filtered off and the filtrate treated with 10 cc. of concentrated (12.5 molar) sodium hydroxide. The reaction mixture became light yellow and upon standing deposited a reddish yellow precipitate. Upon treating with 50 cc. of water most of this dissolved leaving a colorless low melting insoluble material, believed to be saturated fatty glycerides, which was removed from the aqueous solution by filtration. The sodium sulphonate in the aqueous solution had soap-like properties.

The sulphonic acid compounds thus formed form unsaturated aliphatic compounds originally containing olefin linkages can be neutralized with the hydroxide or carbonate of sodium or potassium, or other bases, and the soluble salts thus formed with compounds having about ten to about twenty-two carbon atoms in the molecule have good wetting, sudsing and detergent properties.

Sulphonation of certain classes of aromatic compounds is likewise possible by the use of this new reagent. This procedure is of value where the pure aromatic sulphonic acid is desired as these are in some instances difficult to prepare by previously known procedures.

Those classes of aromatic compounds that react with my reagent may for the purposes of this specification and claims be termed "easily sulphonated aromatic compounds", and consist of the following compounds and classes of compounds:—benzene, naphthalene, alkyl derivatives of benzene such as m-xylene, phenols, amines such as aniline, ethers (both alkyl-aryl and diaryl) such as anisole, sulphido ethers such as phenothioxin, and sulphides (both alkyl-aryl and diaryl).

Other classes of aromatic compounds do not react easily if at all with my reagent, such as halobenzenes, nitrobenzenes, sulphonated hydrocarbons such as benzenesulphonic acid, aryl and aryl-alkyl ketones such as acetophenone and benzophenone, aromatic acids, and esters of aromatic acids.

Following are some examples of the sulphonation of aromatic compounds with my reagent:—

*Example 4. Sulphonation of benzene.*—To a mixture prepared by adding 8 g. of sulphur trioxide to 4.4 g. of dioxane dissolved in 50 cc. of carbon tetrachloride was added 11 cc. of pure benzene. After standing a day the solid dioxane-sulphur trioxide addition product had disappeared and the reaction mixture had separated into two layers. The smaller upper layer, which contained the benzenesulphonic acid and a small amount of solvent, upon warming gently to remove traces of solvent, gave substantially pure benzenesulphonic acid.

Alternatively the upper layer may be poured into a strong sodium chloride solution whereupon a reaction takes place and there separates a good yield of sodium benzenesulphonate.

The reaction may be stated as follows:—

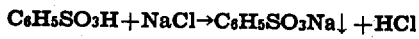

$C_6H_5SO_3H + NaCl \rightarrow C_6H_5SO_3Na\downarrow + HCl$

*Example 5. Sulphonation of naphthalene.*—To a mixture of 8 g. of sulphur trioxide and 4.4 g. of dioxane in 50 cc. of carbon tetrachloride was added 13 g. of pure naphthalene. After standing for a day there was a solid upper layer in the reaction mixture which was different from the original solid reagent. This was practically pure α-naphthalenesulphonic acid. This was dissolved in a little water and the solution added to saturated sodium chloride. This gave a precipitate of the sodium naphthalene sulphonate which when dry weighed 17 g.

*Example 6. Sulphonation of m-xylene.*—To a mixture of 8 g. of sulphur trioxide and 4.4 g. of dioxane in 50 cc. of carbon tetrachloride was added 11 g. of pure m-xylene. Reaction in this instance was immediate. The top liquid layer which soon separated was removed and neutralized with sodium hydroxide and the solution evaporated to dryness. This gave a practically quantitative yield of sodium m-xylenesulphonate.

*Example 7. Sulphonation of indene.*—For this reaction the sulphonation mixture was prepared by adding 8 g. of sulphur trioxide to 8.8 g. of dioxane in 100 cc. of carbon tetrachloride. This was added slowly with stirring to 11.6 g. of indene in 50 cc. of carbon tetrachloride. The temperature was kept below 10° C. There appeared in the reaction mixture a pink colored amorphous solid product. This dissolved readily in water to give an acidic solution which when neutralized with sodium hydroxide behaved like a soap solution. Shaking a small amount of the solution in a flask filled the flask with suds.

Having thus described a new and useful process for sulphating or sulphonating organic compounds, what I claim is:—

1. The process of making the sulphuric ester of an alcohol which comprises reacting sulphur trioxide with dioxane in the presence of a suitable solvent, and treating said alcohol with said reaction product.

2. The process of making the sulphuric ester of lauryl alcohol which comprises reacting sulphur trioxide with dioxane in the presence of a suitable solvent, and treating said lauryl alcohol with said reaction product.

3. The process of making a sulphuric reaction product having good wetting, sudsing and detergent properties, which comprises causing sulphur trioxide to react with dioxane, and treating an alcohol containing from about ten to about twenty-two carbon atoms per molecule with said reaction product.

4. The process of making a sulphuric reaction product having good wetting, sudsing and detergent properties, which comprises causing sulphur trioxide to react with dioxane, treating an alcohol containing from about ten to about twenty-two carbon atoms per molecule with said reaction product, and subsequently neutralizing with a base forming a water-soluble product.

5. The process of making a sulphuric reaction product having good wetting, sudsing and detergent properties, which comprises causing sulphur trioxide to react with dioxane, and treating lauryl alcohol with said reaction product.

6. The process of making a sulphuric reaction product having good wetting, sudsing and detergent properties, which comprises causing sulphur trioxide to react with dioxane, treating lauryl alcohol with said reaction product, and subsequently neutralizing with a base forming a water-soluble product.

7. The process of making a sulphuric reaction product having good wetting, sudsing and detergent properties, which comprises causing sulphur trioxide to react with dioxane, treating lauryl alcohol with said reaction product, and subsequently neutralizing with an alkali.

CHESTER MERLE SUTER.

Certificate of Correction

Patent No. 2,098,114. November 2, 1937.

CHESTER MERLE SUTER

It is hereby certified that error appears in the printed specification of the above numbered patent requiring correction as follows: Page 2, first column, line 38, in the formula, for "$2C_{12}H_{25}\longrightarrow$" read $2C_{12}H_{25}OH\longrightarrow$; and that the said Letters Patent should be read with this correction therein that the same may conform to the record of the case in the Patent Office.

Signed and sealed this 22nd day of February, A. D. 1938.

[SEAL]

HENRY VAN ARSDALE,
*Acting Commissioner of Patents.* carbon tetrachloride was added 11 cc. of pure benzene. After standing a day the solid dioxane-sulphur trioxide addition product had disappeared and the reaction mixture had separated into two layers. The smaller upper layer, which contained the benzenesulphonic acid and a small amount of solvent, upon warming gently to remove traces of solvent, gave substantially pure benzenesulphonic acid.

Alternatively the upper layer may be poured into a strong sodium chloride solution whereupon a reaction takes place and there separates a good yield of sodium benzenesulphonate.

The reaction may be stated as follows:—

$$C_6H_5SO_3H + NaCl \rightarrow C_6H_5SO_3Na\downarrow + HCl$$

*Example 5. Sulphonation of naphthalene.*—To a mixture of 8 g. of sulphur trioxide and 4.4 g. of dioxane in 50 cc. of carbon tetrachloride was added 13 g. of pure naphthalene. After standing for a day there was a solid upper layer in the reaction mixture which was different from the original solid reagent. This was practically pure α-naphthalenesulphonic acid. This was dissolved in a little water and the solution added to saturated sodium chloride. This gave a precipitate of the sodium naphthalene sulphonate which when dry weighed 17 g.

*Example 6. Sulphonation of m-xylene.*—To a mixture of 8 g. of sulphur trioxide and 4.4 g. of dioxane in 50 cc. of carbon tetrachloride was added 11 g. of pure m-xylene. Reaction in this instance was immediate. The top liquid layer which soon separated was removed and neutralized with sodium hydroxide and the solution evaporated to dryness. This gave a practically quantitative yield of sodium m-xylenesulphonate.

*Example 7. Sulphonation of indene.*—For this reaction the sulphonation mixture was prepared by adding 8 g. of sulphur trioxide to 8.8 g. of dioxane in 100 cc. of carbon tetrachloride. This was added slowly with stirring to 11.6 g. of indene in 50 cc. of carbon tetrachloride. The temperature was kept below 10° C. There appeared in the reaction mixture a pink colored amorphous solid product. This dissolved readily in water to give an acidic solution which when neutralized with sodium hydroxide behaved like a soap solution. Shaking a small amount of the solution in a flask filled the flask with suds.

Having thus described a new and useful process for sulphating or sulphonating organic compounds, what I claim is:—

1. The process of making the sulphuric ester of an alcohol which comprises reacting sulphur trioxide with dioxane in the presence of a suitable solvent, and treating said alcohol with said reaction product.

2. The process of making the sulphuric ester of lauryl alcohol which comprises reacting sulphur trioxide with dioxane in the presence of a suitable solvent, and treating said lauryl alcohol with said reaction product.

3. The process of making a sulphuric reaction product having good wetting, sudsing and detergent properties, which comprises causing sulphur trioxide to react with dioxane, and treating an alcohol containing from about ten to about twenty-two carbon atoms per molecule with said reaction product.

4. The process of making a sulphuric reaction product having good wetting, sudsing and detergent properties, which comprises causing sulphur trioxide to react with dioxane, treating an alcohol containing from about ten to about twenty-two carbon atoms per molecule with said reaction product, and subsequently neutralizing with a base forming a water-soluble product.

5. The process of making a sulphuric reaction product having good wetting, sudsing and detergent properties, which comprises causing sulphur trioxide to react with dioxane, and treating lauryl alcohol with said reaction product.

6. The process of making a sulphuric reaction product having good wetting, sudsing and detergent properties, which comprises causing sulphur trioxide to react with dioxane, treating lauryl alcohol with said reaction product, and subsequently neutralizing with a base forming a water-soluble product.

7. The process of making a sulphuric reaction product having good wetting, sudsing and detergent properties, which comprises causing sulphur trioxide to react with dioxane, treating lauryl alcohol with said reaction product, and subsequently neutralizing with an alkali.

CHESTER MERLE SUTER.

Certificate of Correction

Patent No. 2,098,114.                                                                                   November 2, 1937.

CHESTER MERLE SUTER

It is hereby certified that error appears in the printed specification of the above numbered patent requiring correction as follows: Page 2, first column, line 38, in the formula, for "$2C_{12}H_{25}\longrightarrow$" read $2C_{12}H_{25}OH\longrightarrow$; and that the said Letters Patent should be read with this correction therein that the same may conform to the record of the case in the Patent Office.

Signed and sealed this 22nd day of February, A. D. 1938.

[SEAL]

HENRY VAN ARSDALE,
*Acting Commissioner of Patents.*

Certificate of Correction

Patent No. 2,098,114.  November 2, 1937.

CHESTER MERLE SUTER

It is hereby certified that error appears in the printed specification of the above numbered patent requiring correction as follows: Page 2, first column, line 38, in the formula, for "$2C_{12}H_{25}\longrightarrow$" read $2C_{12}H_{25}OH\longrightarrow$; and that the said Letters Patent should be read with this correction therein that the same may conform to the record of the case in the Patent Office.

Signed and sealed this 22nd day of February, A. D. 1938.

[SEAL]
HENRY VAN ARSDALE,
*Acting Commissioner of Patents.*